United States Patent
Suzuki et al.

(10) Patent No.: US 8,165,316 B2
(45) Date of Patent: Apr. 24, 2012

(54) PORTABLE TERMINAL

(75) Inventors: Hiromichi Suzuki, Hamura (JP); Masao Teshima, Kunitachi (JP); Koichi Sato, Tachikawa (JP); Hiroshi Shimasaki, Kunitachi (JP); Satoshi Mizoguchi, Ome (JP); Takashi Amano, Soka (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 597 days.

(21) Appl. No.: 12/364,617

(22) Filed: Feb. 3, 2009

(65) Prior Publication Data

US 2009/0209281 A1    Aug. 20, 2009

(30) Foreign Application Priority Data

Feb. 20, 2008  (JP) ............................. P2008-038213

(51) Int. Cl.
*H01B 15/00* (2006.01)
*G08B 19/00* (2006.01)

(52) U.S. Cl. ............... 381/80; 381/12; 381/58; 381/77; 381/109; 381/111; 340/5.3; 340/5.33; 340/321; 340/525; 348/E5.105; 348/E13.006; 375/347; 455/550.1; 455/566

(58) Field of Classification Search .......... 381/12, 381/58, 77, 80, 109, 111; 340/5.3, 5.33, 340/321, 525; 348/E5.105, E13.006; 375/347; 455/550.1, 566
See application file for complete search history.

(56) References Cited

U.S. PATENT DOCUMENTS

| | | | | |
|---|---|---|---|---|
| 4,470,113 | A * | 9/1984 | Oura | 710/306 |
| 7,373,410 | B2 * | 5/2008 | Monza et al. | 709/229 |
| 7,880,591 | B2 * | 2/2011 | Johnson et al. | 340/321 |

FOREIGN PATENT DOCUMENTS

| | | |
|---|---|---|
| JP | 02-090757 A | 3/1990 |
| JP | 04-022243 A | 1/1992 |
| JP | 2000-332866 A | 11/2000 |
| JP | 2007-096843 A | 4/2007 |

OTHER PUBLICATIONS

Japanese Office Action dated Jan. 24, 2012 as received in application No. 2008-038213.

* cited by examiner

*Primary Examiner* — Dao H Nguyen

(74) *Attorney, Agent, or Firm* — Maschoff Gilmore & Israelsen

(57) ABSTRACT

According to an aspect of the invention, a portable terminal includes: a first audio input-output unit and a second audio input-output unit configured to receive audio when a mode is set as an input mode and output audio when the mode is set as an output mode; and a setting unit configured to set the respective modes of the first audio input-output unit and the second audio input-output unit.

14 Claims, 12 Drawing Sheets

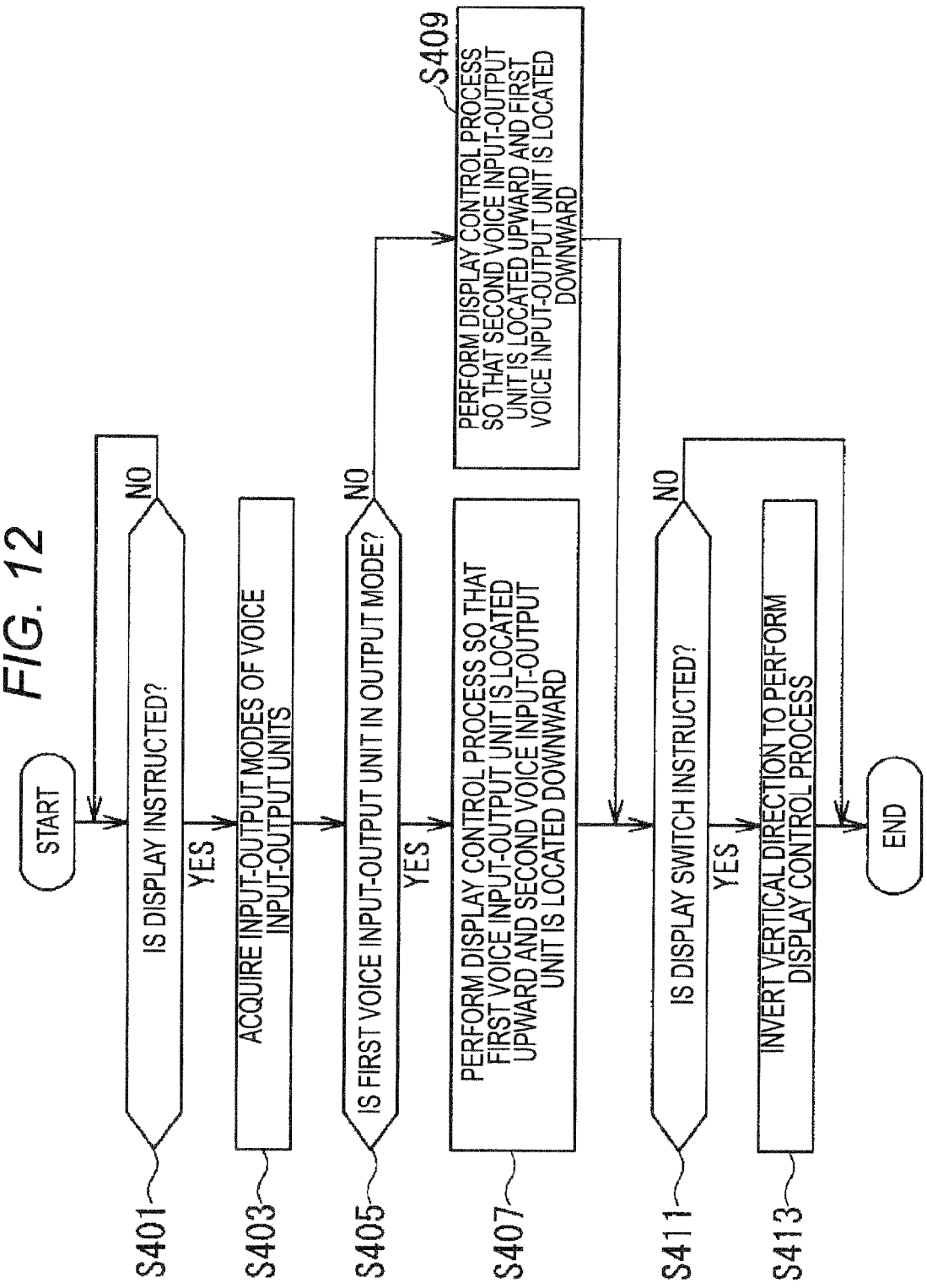

PORTABLE TERMINAL

CROSS-REFERENCE TO RELATED APPLICATIONS

This application is based upon and claims the benefit of priority from Japanese Patent Application No. 2008-038213, filed Feb. 20, 2008, the entire contents of which are incorporated herein by reference.

BACKGROUND

1. Field

The present invention relates to a portable terminal including plural audio input-output units capable of switching and using both an audio input function and an audio output function.

2. Description of the Related Art

In a known portable terminal, a display and operation keys are separated from each other and the operation keys are generally disposed below the display for a convenient operation. In this basic structure, generally, a speaker is disposed above the display and a microphone is disposed below the keys. Therefore, when a call is made and a user speaks to someone on the telephone, the user has a habit of mechanically seizing the portable terminal so that the speaker is faced upward. In recent years, a design became an important factor when portable terminals are developed. These portable terminals have a thin structure and a large display. Moreover, full-screen display terminals having a touch panel were developed in order to facilitate the use of various applications such as music, movies, and games.

In view of this circumstance, there was suggested a portable terminal capable of increasing the volume of a back cavity of an acoustic converter and improving the hermetic property of the acoustic converter without structural restriction caused due to the miniaturization and thinness (for example, JP-A-2007-96843). The suggested portable terminal includes a holding member holding a speaker, an extension member extending from the end of an opening of the holding member in an outer peripheral direction of the speaker to come in contact with the inner surface of a casing, and a rib member extending from the peripheral edge of the extension member to come in contact with a circuit board. In the portable terminal, the holding member holding the speaker is disposed to hermetically seal the back cavity as a rear surface space of the speaker formed between the holding member and the circuit board.

In future, when a frame becomes narrower with the larger screen of the portable terminal, the portable terminal has an appearance of a point symmetrical structure. Therefore, it may be difficult for a user to distinguish a direction of a speaker from a direction of a microphone in a longitudinal direction of the portable terminal. Even in such a situation, a demand for a portable terminal capable of performing a telephone communication without difficulty for a user to handle the portable terminal is increased.

SUMMARY OF THE INVENTION

According to an aspect of the present invention, there is provided a portable terminal including a first audio input-output unit and a second audio input-output unit configured to receive audio when a mode is set as an input mode and output audio when the mode is set as an output mode; and a setting unit configured to set the respective modes of the first audio input-output unit and the second audio input-output unit.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 12 is an exemplary flowchart, illustrating a sequence of the display control process based on the input-output modes of the audio input-output units in the portable terminal according to the second embodiment.

DETAILED DESCRIPTION

First Embodiment

Figure 1:
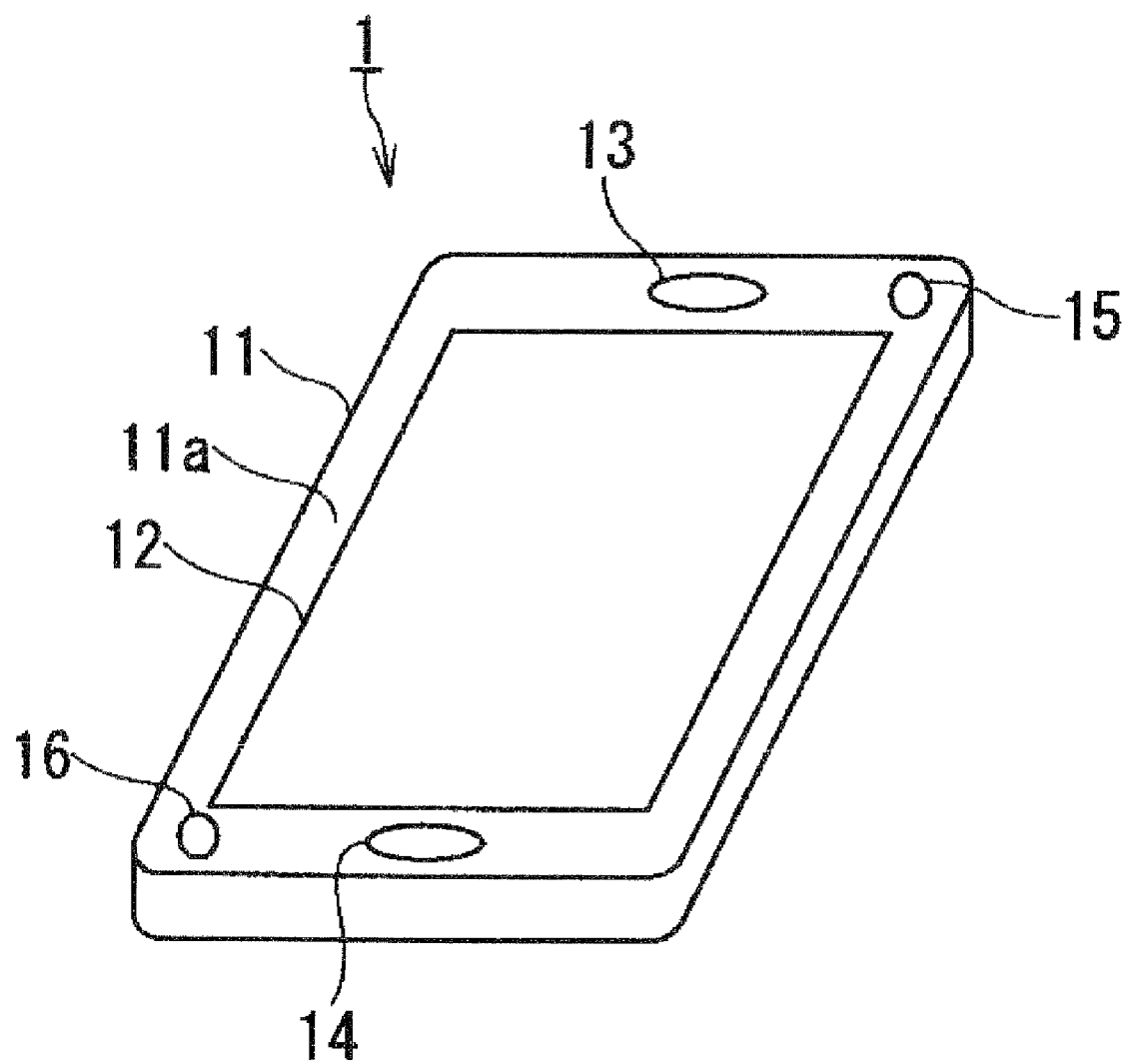
FIG. 1 is an exemplary perspective view illustrating a portable terminal when viewed from a front side according to a first embodiment of the invention.

A portable terminal will be described with reference to the accompanying drawings according to a first embodiment of the invention. As an example of the portable terminal in the first embodiment, a card type portable terminal 1 will be described. FIG. 1 is a perspective view illustrating the portable terminal 1 when viewed from a front side.

As shown in FIG. 1, the portable terminal 1 includes a casing 11 having a business card size, for example. Functions for using the portable terminal 1 as a communication terminal are provided in a front surface 11a of the casing 11. Specifically, a picture constituted by texts, images, and the like is displayed on the front surface 11a of the casing 11. In addition, the front surface 11a is provided with a touch screen 12 for inputting information by touch of fingers or a pen, a first audio input-output unit 13 and a second audio input-output unit 14 having both an audio input function and an audio output function, a first LED 15 notifying an input-output mode of the first audio input-output unit 13, and a second LED 16 notifying an input-output mode of the second audio input-output unit 14.

The touch screen 12 is a display member which having a display function for displaying the picture constituted by texts, images, and the like and an input function for inputting an instruction by touch of fingers or an exclusive pen against the picture. In the touch screen 12, plural elements detecting the touch on a surf-ace are disposed on the display and a transparent screen is laminated on the elements. A method of detecting the touch on the touch screen 12 may be of a pressure detection type detecting a variation in pressure or a static-electricity type detecting electric signals with static electricity.

The first audio input-output unit 13 and the second audio input-output unit 14, which are formed of a magnet, a coil, and a diaphragm, carry out both functions of a microphone and a speaker. The first audio input-output unit 13 and the second audio input-output unit 14, which are each set to the input-output mode of the input mode and the output mode, serves as the microphone to input an audio when the input mode is set and serves as the speaker to output an audio when the output mode is set.

The first LED 15 is disposed in the vicinity of the first audio input-output unit 13 and notifies the input-output mode with colors by carrying out lighting when the first audio input-output unit 13 is in the input mode, carrying out lighting when the first audio input-output unit 13 is in the output mode, or carrying out brightening with plural colors. The second LED 16 is disposed in the vicinity of the second audio input-output unit 14 and notifies the input-output mode of the second audio input-output unit 14 in the same manner as that in the first LED 15.

Figure 2:
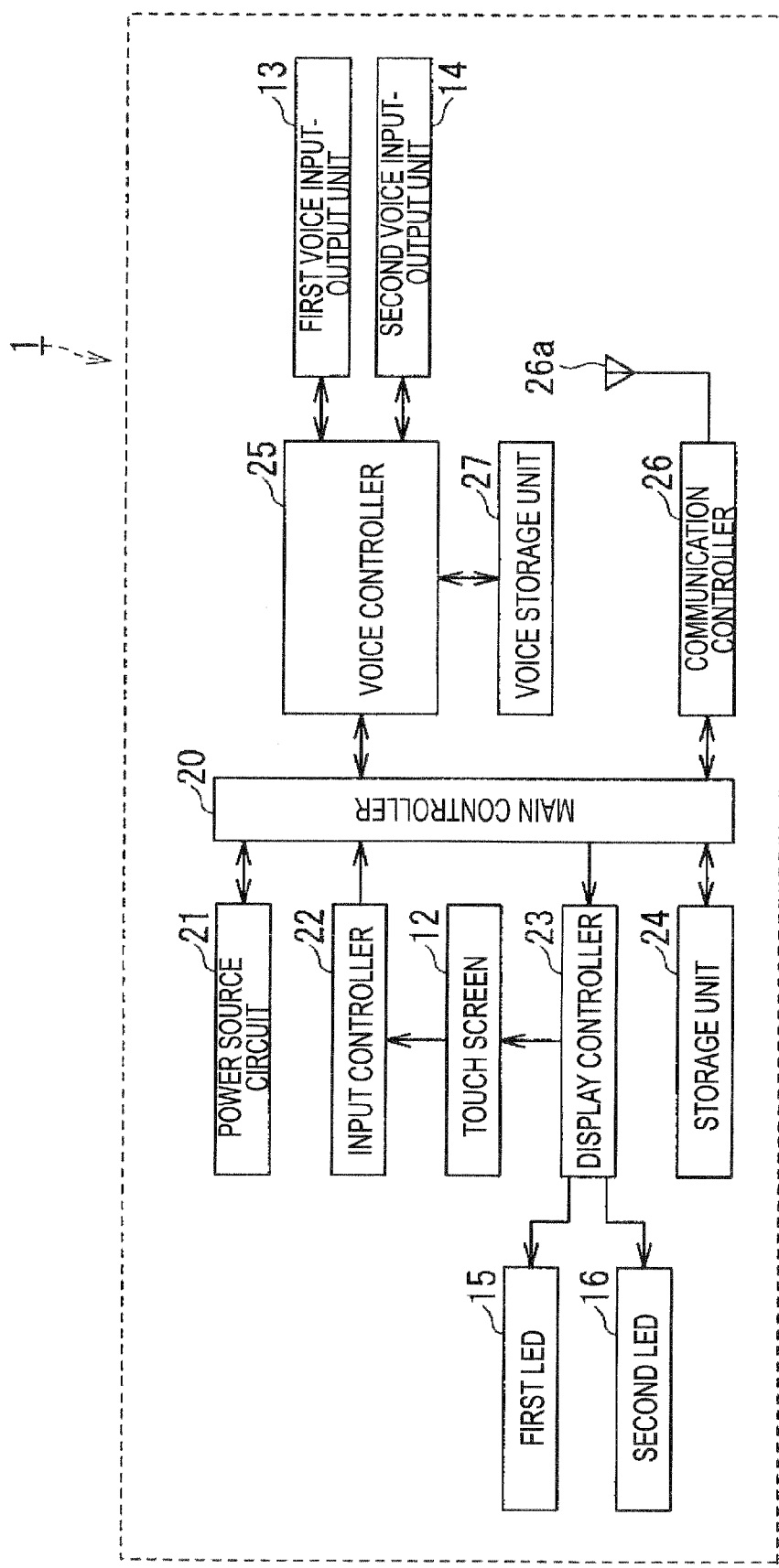
FIG. 2 is an exemplary block diagram illustrating functions of the portable terminal according to the first embodiment.

Next, the functions of the portable terminal 1 will be described. FIG. 2 is a block diagram illustrating functions of the portable terminal 1. As shown in FIG. 2, the portable terminal 1 includes a main controller 20, a power source circuit 21, an operation input controller 22, a display controller 23, a storage unit 24, an audio controller 25, a communication controller 26, and an audio storage unit 27 which are electrically connected to each other through a bus.

The main controller 20 provided with a CPU (Central Processing Unit) generally controls the portable terminal 1 and performs various calculation processes or control processes. The power source circuit 21 switches ON/OFF states on the basis of the input through the touch screen 12 by a user; for examples and supplies electric power from a power source (a battery, etc.) equipped in the portable terminal or a power source connected to the outside to respective constituent units to operate the portable terminal 1.

The operation input controller 22 provided with an input interface for the touch screen 12 detects pressure applied to the touch screen 12 and generates signals indicting locations where the pressure is applied to transmit the signals to the main controller 20. The display controller 23 provided with a display interface for the touch screen 12 displays a display picture constituted by texts, images, and the like on the basis of the control of the main controller 20. Moreover, the display controller 23 inverts a vertical direction of the display on the touch screen 12 on the basis of instructions of the main controller 20 or the audio controller 25.

The storage unit 24 includes a ROM (Read-Only Memory) or a hard disc storing programs for the processes performed by the main controller 20, a non-volatile memory, and a RAM (Random Access Memory) temporarily storing data used for the main controller 20 to perform the processes. In addition, the storage unit 24 also includes programs or data necessary for audio input and output control processes performed by the audio controller 25 and display control processes performed by the display controller 23.

The audio controller 25 generate analog audio signals from an audio input by the first audio input-output unit 13 and the second audio input-output unit 14 on the basis of the control of the main controller 20, and converts the analog audio signals into digital audio signals. The audio controller 25 converts the digital audio signals into analog audio signals on the basis of the control of the main controller 20 when acquiring the digital audio signals, and output the converted analog audio signals as an audio from the first audio input-output unit 13 or, the second audio input-output unit 14. The audio controller 25 performs an audio input-output control process of setting the respective input-output modes of the first audio input-output unit 13 and the second audio input-output unit 14.

The communication controller 26 performs a spectrum inverse diffusion process on signals received through plural antennas 26a from a base station on the basis of the control of the main controller 20 to restore data. The data is transmitted to the audio controller 25 by the instruction of the main controller 20 to be output from the first audio input-output unit 13 or the second audio input-output unit 14, or the data is transmitted to the display controller 23 to be displayed on the touch screen 12 or stored in the storage unit 24.

The communication controller 26 performs the spectrum inverse diffusion process on the data on the basis of she control of the main controller 20 and transmits the data to the base station through the plural antennas 26a, when acquiring the audio signals input through the first audio input-output unit 13 or the second audio input-output unit 14, the data input though the touch screen 12, or the data stored in the storage unit 24.

The communication controller 26 selects an antenna having the highest radio-wave reception sensitivity among the plural antennas 26a to carry out communication using the selected antenna 26a (diversity scheme). The communication controller 26 continues to measure the respective radio-wave reception sensitivities of the antennas 26a and transmits information indicating the radio-wave reception sensitivity of the antennas 26a on the basis of the instruction of the main controller 20 or the audio controller 25. The main controller 20 permits displaying a mark or the like indicating the radio-wave reception sensitivity of the antennas 26a on the touch screen 12 on the basis of the information, when acquiring the radio-wave reception sensitivity of the antennas 26a. The audio controller 25 sets the respective input-output modes of the first audio input-output unit 13 and the second audio input-output unit 14 on the basis of the information when acquiring the information on the radio)-wave reception sensitivity of the antennas 26a.

The audio storage unit 27 includes a storage member such as a PAM temporarily storing audio data output by the audio controller 25. In a state (a state where both the first audio input-output unit 13 and the second audio input-output unit 14 are set to the input mode) where the portable terminal 1 cannot output an audio, the audio controller 25 temporarily stores the audio data received by the communication controller 26 in the audio storage unit 27, and then outputs the audio data stored in the audio storage unit 27 from the first audio input-output unit 13 or the second audio input-output unit 14 in a state where the portable terminal 1 can output the audio.

EXAMPLE 1

Figure 3:
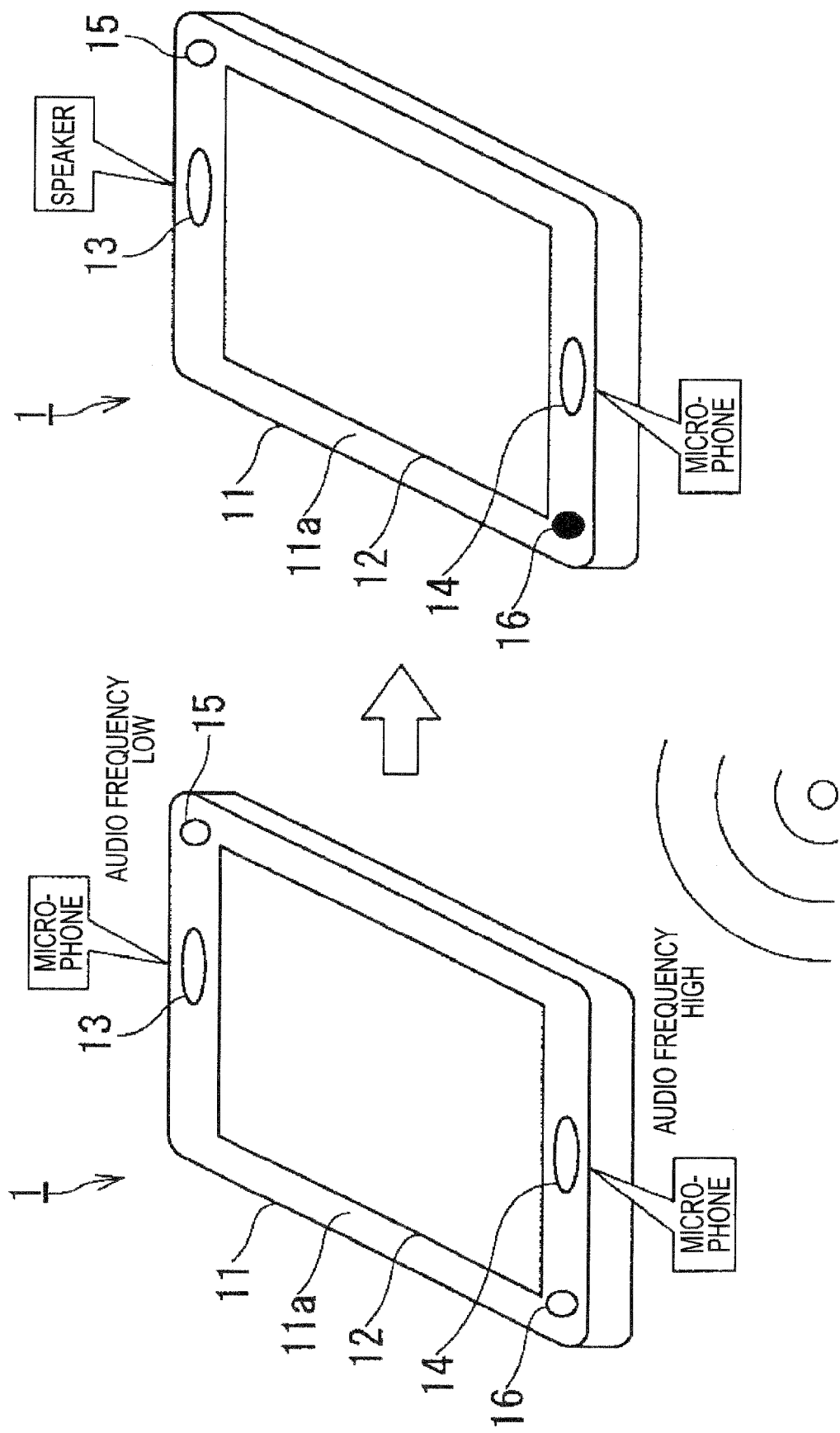
FIG. 3 is an exemplary diagram for explaining an audio input-output control process based on an audio frequency in the portable terminal according to the first embodiment.
Figure 4:
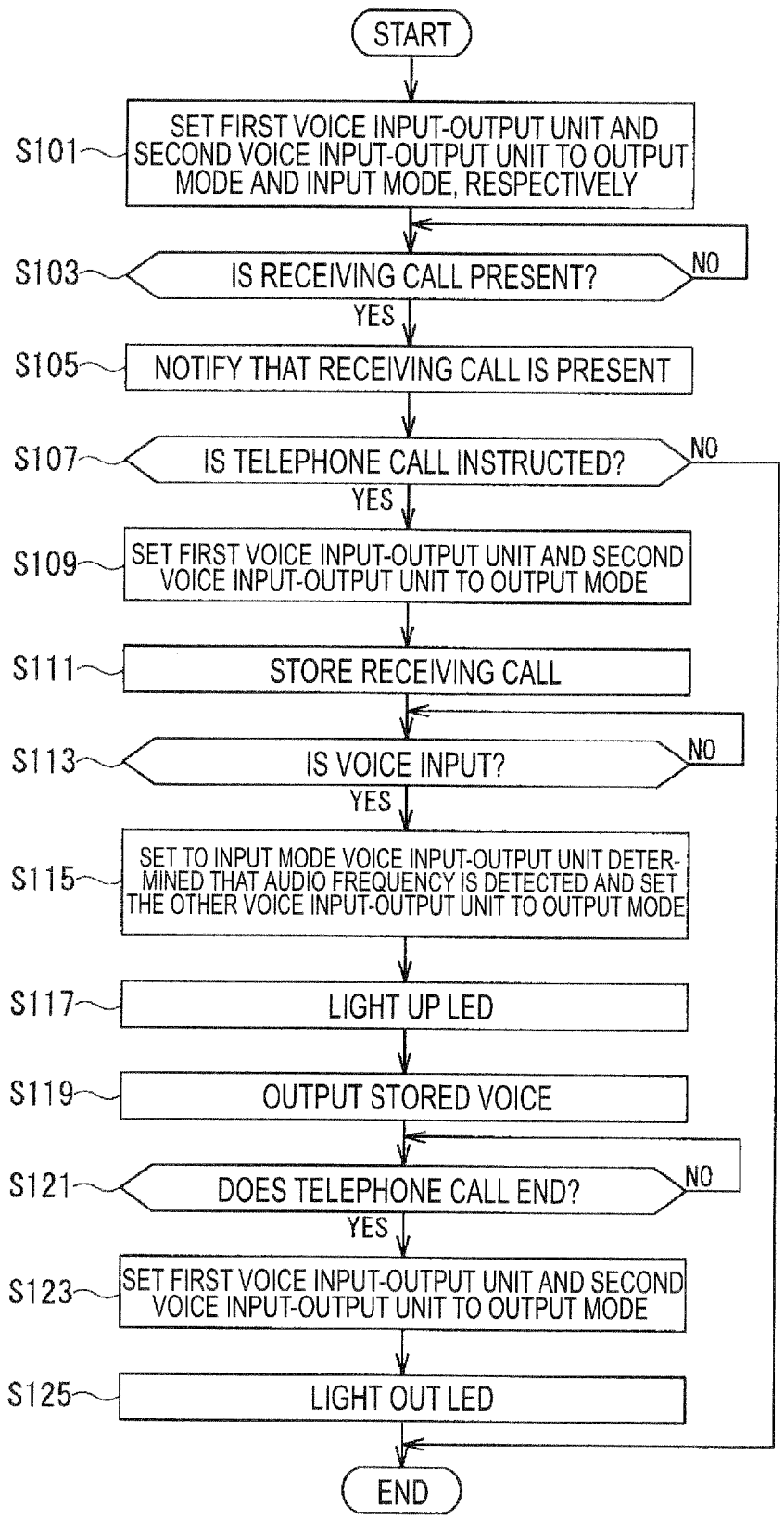
FIG. 4 is an exemplary flowchart illustrating a sequence of the audio input-output control process based on a noise sound in the portable terminal according to the first embodiment.

The portable terminal 1 will be described with reference to FIGS. 2 and 4 according to Example 1 of the first embodiment. As shown in FIG. 3, the portable terminal 1 performs the audio input-output control process of setting the respective input-output modes of the first audio input-output unit 13 and the second audio input-output unit 14 on the basis of an audio (an audio having an audio frequency) such as a user audio at calling time. A sequence of the audio input-output control process performed by the portable terminal 1 in Example 1 will be described with reference a flowchart shown in FIG. 4. Hereinafter, a word "Step" is omitted as in "S101" from "Step S101", for example.

In a standby state of the portable terminal 1, the audio controller 25 sets both the first audio input-output unit 13 and the second audio input-output unit 14 to the output mode (S101). By setting the first audio input-output unit 13 and the second audio input-output unit 14 to the output mode, it is possible to promptly output an audio from both the first audio input-output unit 13 and the second audio input-output unit 14 when an audio is output during a receiving call or at end time of an alarm, for example. The audio controller 25 determines whether a receiving call is present in the portable terminal 1 (S103). When the receiving call is not present (No in S103), the audio controller 25 just stands by.

Alternatively, when the receiving call is present in the portable terminal 1 (Yes in S103), the audio controller 25 notifies a user that the receiving call is present by outputting a predetermined sound by the first audio input-output unit 13 and the second audio input-output unit 14 set to the output mode, for example (S105). At this time, the display controller 23 may notify the user that the receiving call is present, by displaying a text or an image on the touch screen 12.

The audio controller 25 determines whether a telephone call is instructed (S107). At this time, it is determined that the telephone call is instructed when an input operation is performed through the touch screen 12 by the user, for example. When the telephone call is not instructed (No in S107), the audio controller 25 just ends the audio input output control process.

Alternatively, when the telephone call is instructed (Yes in S107), the audio controller 25 sets both the first audio input-output unit 13 and the second audio input-output unit 14 to the input mode (S109). In this way, it is possible to receive the audio by the user from both the first audio input-output unit 13 and the second audio input-output unit 4. In addition, in a step of instructing the telephone call and interrupting the audio being received from an opponent side, both the first audio input-output unit 13 and the second audio input-output unit 14 may be set to the input mode.

The audio controller 25 stores an audio received through the antennas 26a in the audio storage unit 27 while both the first audio input-output unit 13 and the second audio input-output unit 14 are set to the input mode, since an audio (an audio of an communication opponent) received through the antennas 26a cannot be output when both the first audio input-output unit 13 and the second audio input-output unit 14 are set to the input mode in Step S109 (S111).

The audio controller 25 determines whether an audio is input to the first audio input-output unit 13 or the second audio input-output unit 14 (S113). At this time, it is determined that the audio is input, when the level of the audio component on the audio exceeds a predetermined value, for example. When it is determined that the audio is not input (No in S113), it is waited until the audio is input.

Alternatively, when it is determined that the audio is input (Yes in S113), the audio controller 25 sets to the input mode one of the first audio input-output unit 13 and the second audio input-output unit 14 which is determined that the audio having the audio frequency is input, and sets to the output mode the other thereof which is determined that the audio having the audio frequency is not input (S115). In addition, when the audio having the audio frequency is input to the first audio input-output unit 13 and the second audio input-output unit 14, the audio controller 25 sets to the input mode one of the first audio input-output unit 13 and the second audio input-output unit 14 to which an audio having a higher level is input and sets to the output mode the other thereof to which an audio having a lower level is input.

In this way, the user can smoothly make a telephone call without awareness of a direction of the portable terminal 1 by automatically setting to the input mode (microphone) one of the first audio input-output unit 13 the second audio input-output unit 14 which is closer to a mouth as an audio source and sets to the output mode (speaker) and the other thereof which is away from the mount as the audio source, when the user makes a telephone call with the portable terminal 1.

The display controller 23 notifies the input-output mode of the first audio input-output unit 13 and the second audio input-output unit 14 set in Step S115 to the user, by receiving an instruction from the audio controller 25 and lighting up the first LED 15 or the second LED 16 (S117). As shown in FIG. 3, the second LED 16 closer to an input side (microphone) is lighted up and the first LED 15 closer to the output side (speaker) is lighted out, for example, when the first audio input-output unit 13 is set to the output mode and the second audio input-output unit 14 is set to the input mode. In this way, the user can confirm the input-output mode of the first audio input-output unit 13 and the second audio input-output unit 14 with the eyes.

The audio controller 25 acquires the audio stored in the audio storage unit 27 in Step S111 and outputs the audio from one of the first audio input-output unit 13 and the second audio input-output unit 14 which is set to the output mode in S117 (S119). In this way, it is possible to output to the user the audio received through the antennas 26a while both the first audio input-output unit 13 and the second audio input-output unit 14 are input to the input mode in Step S109.

The audio controller 25 determines whether the telephone call ends or not (S121). At this time, it is determined that the telephone call ends when the user inputs a message through the touch screen 12 or the communication with the communication opponent is interrupted, for example. When the telephone call does not end (No in S121), the audio controller 25 stands by until the end of the telephone call.

Alternatively, when the telephone call ends (Yes in S121), the audio controller 25 sets both the first audio input-output unit 13 and the second audio input-output unit 14 to the output mode (S123). In this way, as in Step S101, it is possible to promptly output the audio from both the first audio input-output unit 13 and the second audio input-output unit 14, if necessary.

The display controller 23 receives an instruction from the audio controller 25 and lights out the first LED 15 or the second LED 16 lighted up in Step S117 (S123). In this way, the user can confirm the input-output mode of the first audio input-output unit 13 and the second audio input-output unit 14 with the eyes.

In this way, the portable terminal 1 includes the first audio input-output unit and the second audio input-output unit having both the audio input function and the audio output function. Therefore, both the first audio input-output unit and the second audio input-output unit are set to the output mode (speaker) at standby time and set to the input mode (microphone) at the time point when the opponent audio is interrupted at receiving call time, so that the audio having the audio frequency is detected at the input time of the user audio. At this time, one of the first audio input-output unit and the second audio input-output unit to which the audio having the audio frequency is input is set to the input mode (microphone) and the other to which the audio having the audio frequency is not input is set to the output mode (speaker).

The portable terminal 1 temporarily stores the audio data received from the opponent in the audio storage unit 27 while both the first audio input-output unit and the second audio input-output unit are set to the input mode. In addition, the portable terminal 1 outputs the stored audio data as an audio and clears the output audio data at any time when one of the first audio input-output unit 13 and the second audio input-output unit 14 is set to the output mode.

When one of the first audio input-output unit and the second audio input-output unit is set to the input mode and the other is set to the output mode, the one set to the input mode may be switched to the output mode and the other set to the output mode may be switched to the input mode on the basis of an input operation of the user through the touch screen 12.

According to Example 1 of the first embodiment, the portable terminal 1 includes the first audio input-output unit 13 and the second audio input-output unit 14 capable of switching and using both the audio input function and the audio output function. Therefore, the user can use portable terminal 1 without awareness of the microphone and the speaker while QOS (Quality of Service) of an audio is maintained, compared to a terminal which separately include an audio input unit (microphone) and an audio output unit (speaker). Accordingly, usability of the portable device is improved.

According to Example 1 of the first embodiment, the portable terminal 1 can determine more accurately an input side and an output side of the first audio input-output unit 13 and the second, audio input-output unit 14, by detecting the input of the user audio at calling time and setting the respective input-output modes of the first audio input-output unit 13 and the second audio input-output unit 14 on the basis of the detection result.

EXAMPLE 2

Figure 5:
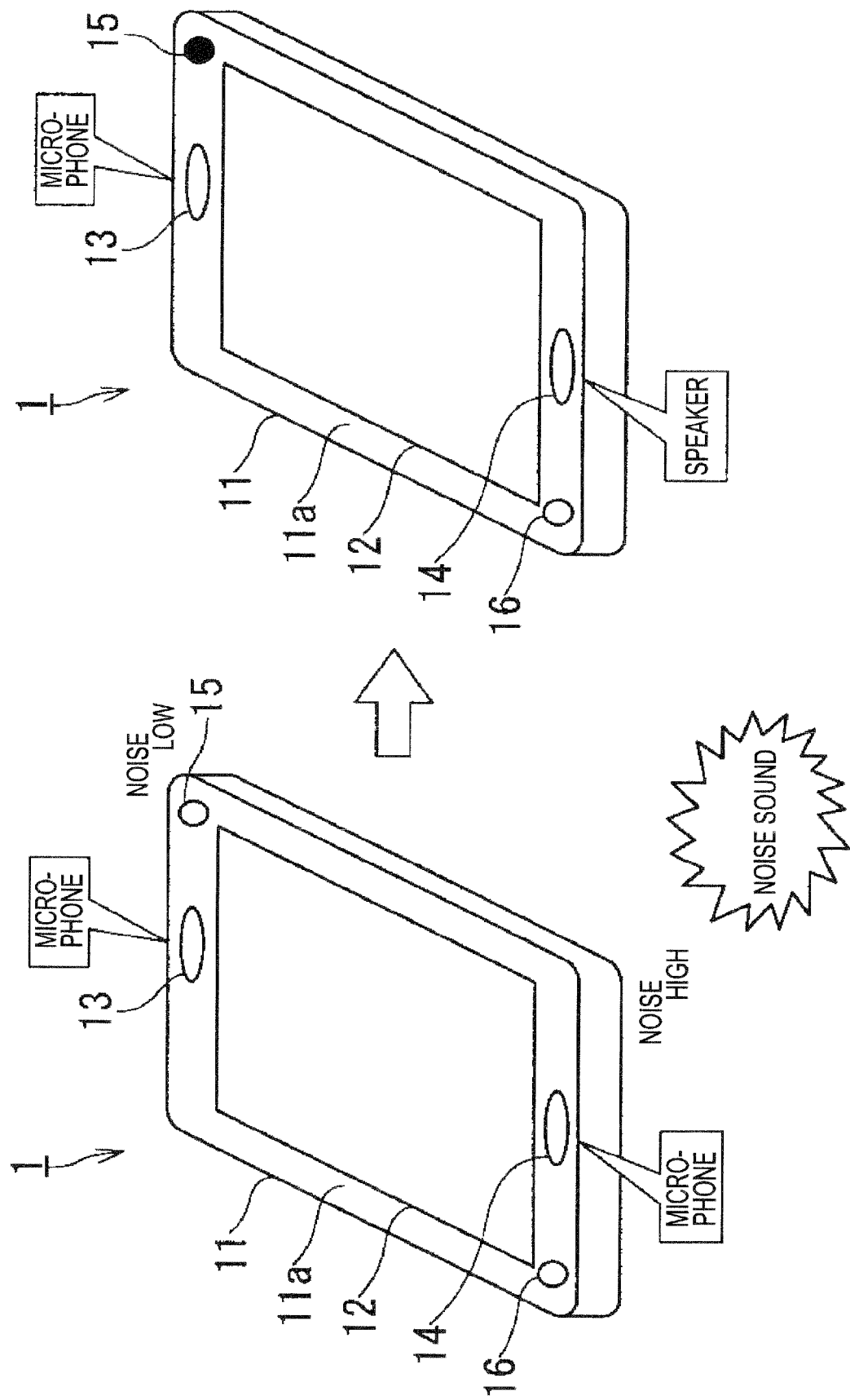
FIG. 5 is an exemplary diagram for explaining an audio input-output control process based on a noise sound in the portable terminal according to the first embodiment.
Figure 6:
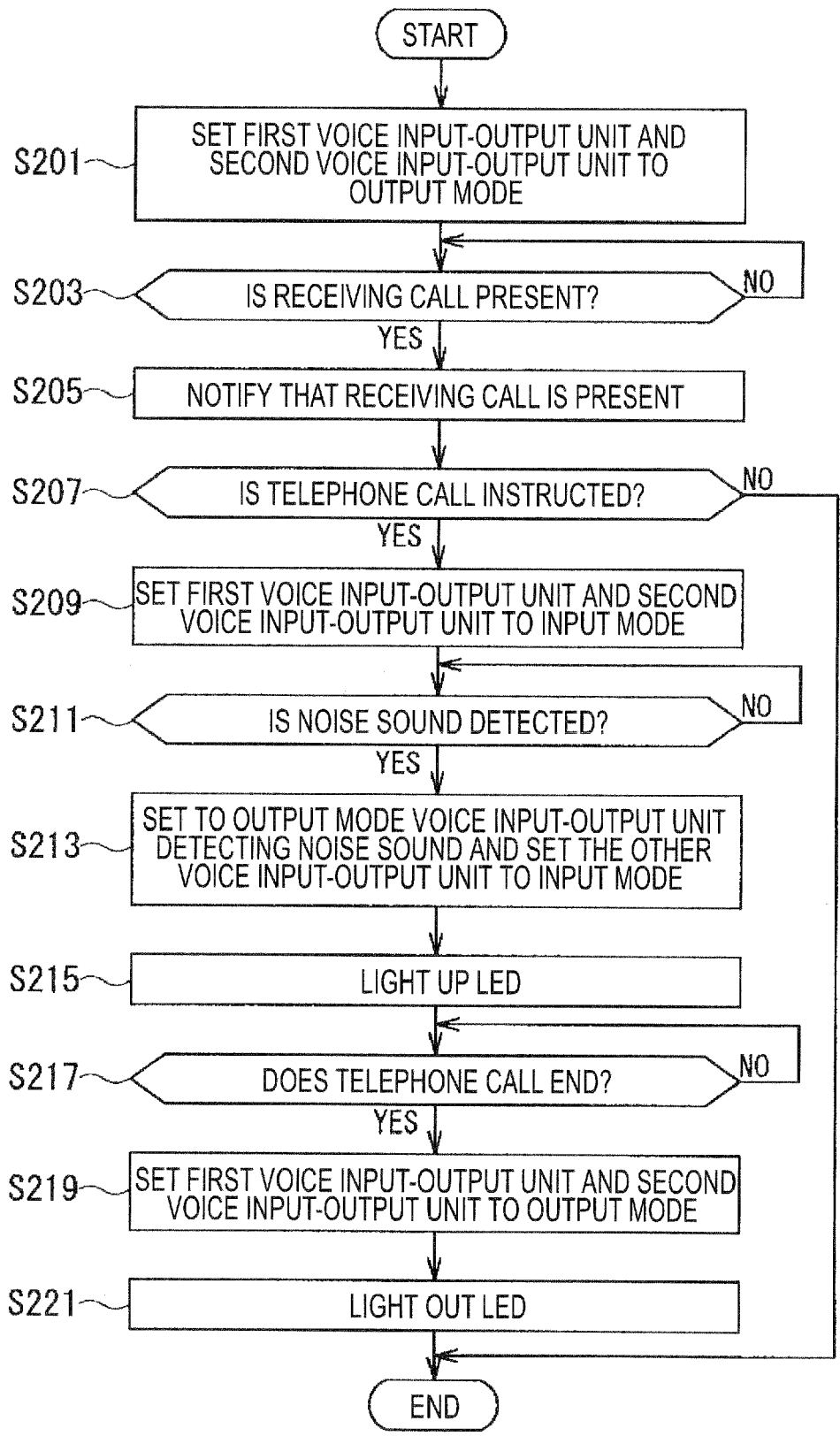
FIG. 6 is an exemplary flowchart illustrating a sequence of the audio input-output control process based on the noise sound in the portable terminal according to the first embodiment.

The portable terminal 1 will be described with reference to FIGS. 5 and 6 according to Example 2 of the first embodiment. As shown in FIG. 5 the portable terminal 1 performs the audio input-output control process of setting the respective input-output modes of the first audio input-output unit 13 and the second audio input-output unit 14 on the basis of a noise sound at calling time. A sequence of the audio input-output control process performed by the portable terminal 1 in Example 2 will be described with reference a flowchart shown in FIG. 6.

Like Step S101, in a standby state of the portable terminal 1, the audio controller 25 sets both the first audio input-output unit 13 and the second audio input-output unit 14 to the output mode (S201). The audio controller 25 determines whether a receiving call is present in the portable terminal 1 (S203). When the receiving call is not present (No in S203), the audio controller 25 just stands by.

Alternatively, when the receiving call is present in the portable terminal 1 (Yes in S203), the audio controller 25 notifies a user that the receiving call is present by outputting a predetermined sound by the first audio input-output unit 13 and the second audio input-output unit 14 set to the output mode, for example (S205). At this time, the display controller 23 may notify the user that the receiving call is present, by displaying a text or an image on the touch screen 12.

The audio controller 25 determines whether a telephone call is instructed (S207). At this time, it is determined that the telephone call is instructed when an input operation is performed through the touch screen 12 by the user, for example. When the telephone call is not instructed (No in S207), the audio controller 25 just ends the audio input-output control process.

Alternatively, when the telephone call is instructed (Yes in S207), the audio controller 25 sets both the first audio input-output unit 13 and the second audio input-output unit 14 to the input mode (S209). In this way, it is possible to receive the audio from both the first audio input-output unit 13 and the second audio input-output unit 14.

The audio controller 25 determines whether the noise sound is detected in the first audio input-output unit 13 or the second audio input-output unit 14 (S211). At this time, it is determined that the noise sound is detected, when the level of the noise sound exceeds a predetermined value, for example. For example, the noise sound occurs when the first audio input-output unit 13 or the second audio input-output unit 14 of the portable terminal 1 is touched to an object (for example, an ear of the user). When it is determined that the noise sound is not detected (No in S211), it is waited until the noise sound is detected.

Alternatively, when it is determined that the noise sound is detected (Yes in S211), the audio controller 25 sets to the input mode one of the first audio input-output unit 13 and the second audio input-output unit 14 which detects the noise sound, and sets to the output mode the other thereof which does not detect the noise sound (S213). In addition, when the noise sound is detected in both the first audio input-output unit 13 and the second audio input-output unit 14, the audio controller 25 sets to the output mode one of the first audio input-output unit 13 and the second audio input-output unit 14 which detects the noise sound having a higher level and sets to the input mode the other thereof which detects the noise sound having lower level.

In this way, the user can smoothly make a telephone call without awareness of a direction of the portable terminal 1 by automatically setting to the output mode (speaker) one of the first audio input-output unit 13 and the second audio input-output unit 14 which is touched to the ear and sets to the input mode (microphone) the other which is not touched to the ear, when the user makes a telephone call with the portable terminal 1.

The display controller 23 notifies the input-output mode of the first audio input-output unit 13 and the second audio input-output unit 14 set in Step S213 to the user, by receiving an instruction from the audio controller 25 and lighting up the first LED 15 or the second LED 16 (S215). As shown in FIG. 5, the first LED 15 closer to an input side (microphone) is lighted up and the second LED 16 closer to the output side (speaker) is lighted out, for example, when the first audio input-output unit 13 is set to the input mode and the second audio input-output unit 14 is set to the output mode. In this way, the user can confirm the input-output mode of the first audio input-output unit 13 and the second audio input-output unit 14 with the eyes.

The audio controller 25 determines whether the telephone call ends or not (S217). At this time, it is determined that the telephone call ends when the user inputs a message through the touch screen 12 or the communication with the communication opponent is interrupted, for example. When the telephone call does not end (No in S217), the audio controller 25 stands by until the end of the telephone call.

Alternatively, when the telephone call ends (Yes in S217), the audio controller 25 sets both the first audio input-output unit 13 and the second audio input-output unit 14 to the output mode (S219). In this way, like Step S201, it is possible to promptly output the audio from both the first audio input-output unit 13 and the second audio input-output unit 14, if necessary.

The display controller 23 receives an instruction from the audio controller 25 and lights out the first LED 15 or the second LED 15 lighted up in Step S215 (S221). In this way, the user can confirm the input-output mode of the first audio input-output unit 13 and the second audio input-output unit 14 with the eyes.

In this way, the portable terminal 1 includes the first audio input-output unit and the second audio input-output unit having both the audio input function and the audio output function. Therefore, both the first audio input-output unit and the second audio input-output unit are set to the output mode (speaker) at standby time and set to the input mode (microphone) at the time point when the opponent audio is interrupted at receiving call time, so that the noise sound is detected at time of touching the ear of the use to the casing 11. At this time, one of the first audio input-output unit and the second audio input-output unit to which the noise sound is input is set to the output mode (speaker) and the other thereof to which the noise sound is not input is set to the input mode (microphone).

According to Example 2 of the first embodiment, the portable terminal 1 includes the first audio input-output unit 13 and the second audio input-output unit 14 capable of switching and using both the audio input function and the audio output function. Therefore, the user can use portable terminal 1 without awareness of the microphone and the speaker while QOS (Quality of Service) of an audio is maintained, compared to a terminal which separately include an audio input unit (microphone) and an audio output unit (speaker). Accordingly, usability of the portable device is improved.

According to Example 2 of the first embodiment, the portable terminal 1 can determine more accurately an input side and an output side of the first audio input-output unit 13 and the second audio input-output unit 14, by detecting the input of the noise sound at calling time and setting the respective input-output modes of the first audio input-output unit 13 and the second audio input-output unit 14 on the basis of the detection result.

Second Embodiment

A portable terminal will be described with reference to the accompanying drawings according to a second embodiment of the invention. As an example of the portable terminal in the second embodiment, a card type portable terminal 1A still be described as in the first embodiment. The same reference numerals are given to the same constituent elements as those in the first embodiment.

Figure 7:
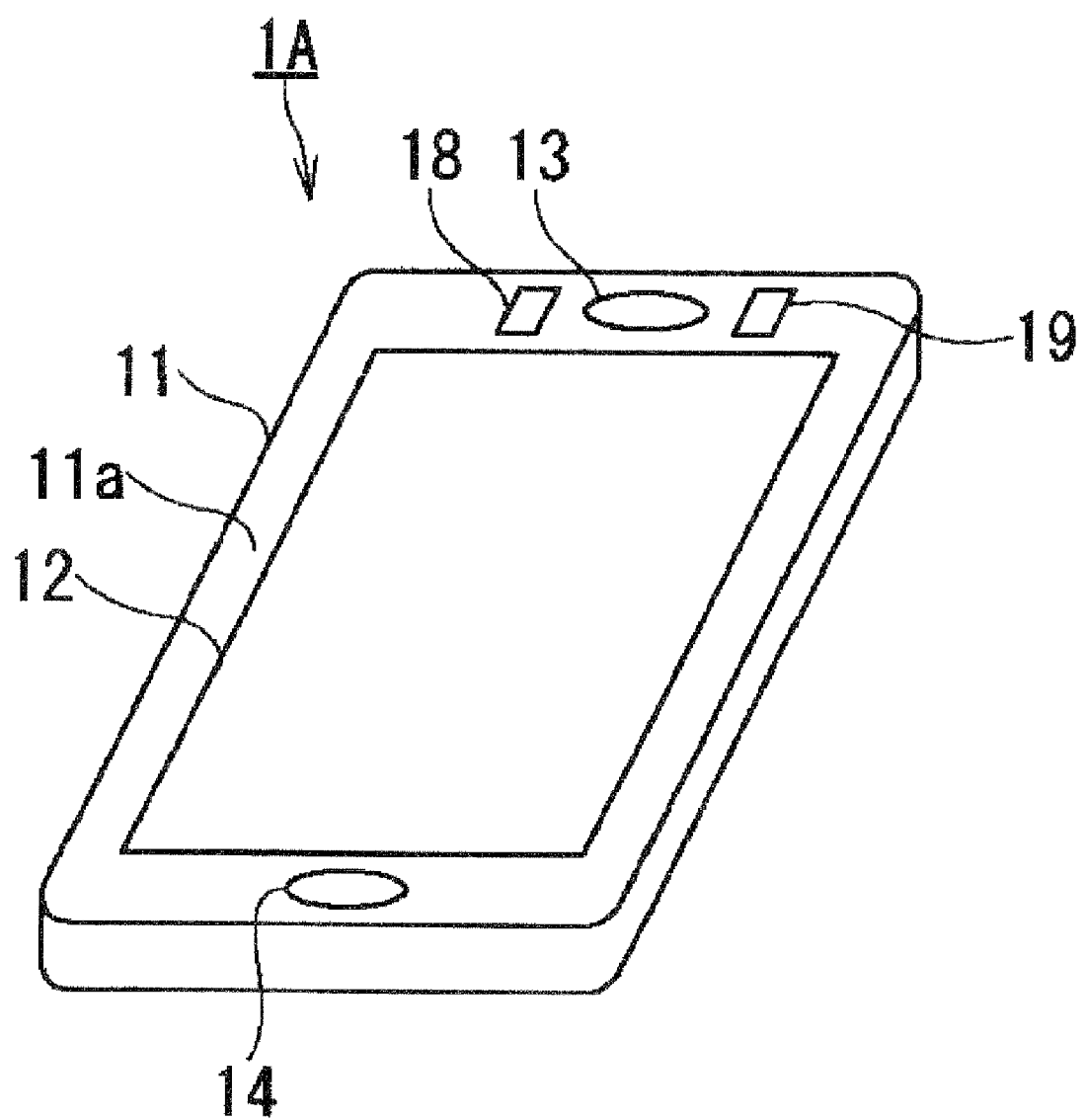
FIG. 7 is an exemplary perspective view illustrating a portable terminal when viewed from a front side according to a second embodiment of the invention.

FIG. 7 is a perspective view illustrating the portable terminal 1A when viewed from a front side. As shown in FIG. 7, the portable terminal 1A includes a casing 11 having a business card size, for example. Functions for using the portable terminal 1A as a communication terminal are provided in a front surface 11a of the casing 11. Specifically, display information such as texts, images, and the like is displayed on the front surface 11a of the casing 11. In addition, the front surface 11a is provided with a touch screen 12 for inputting information by touch of fingers or a pen, a first audio input-output unit 13 and a second audio input-output unit 14 having both an audio input function and an audio output function, an optical sensor 18 detecting the level of input light, and a pressure sensor 19 detecting an applied pressure.

The optical sensor 18 is a sensor which detects an electromagnetic energy of ambient light or the like incident on the portable terminal 1A. A method of measuring the level of light may be a method of detecting a temperature increase caused the incident light on a light-receiving unit (photosensor) or a method of converting the light incident on the light-receiving unit into electric signals. The optical sensor 18 generates signals indicating the level of the incident light and transmits the generated signals to a detection unit 28.

The pressure sensor 19 is a sensor which detects a pressure applied to the portable terminal 1A and is a diaphragm gauge, for example, in MEMS (Micro Electro Mechanical Systems). The pressure sensor 19 detects deformation of the pressure applied to a diaphragm. A variation in electrostatic capacity or a deformation gauge is used in a method of detecting the deformation. The pressure sensor 19 generates signals indicating the applied pressure and transmits the generated signals to the detection unit 28.

Figure 8:
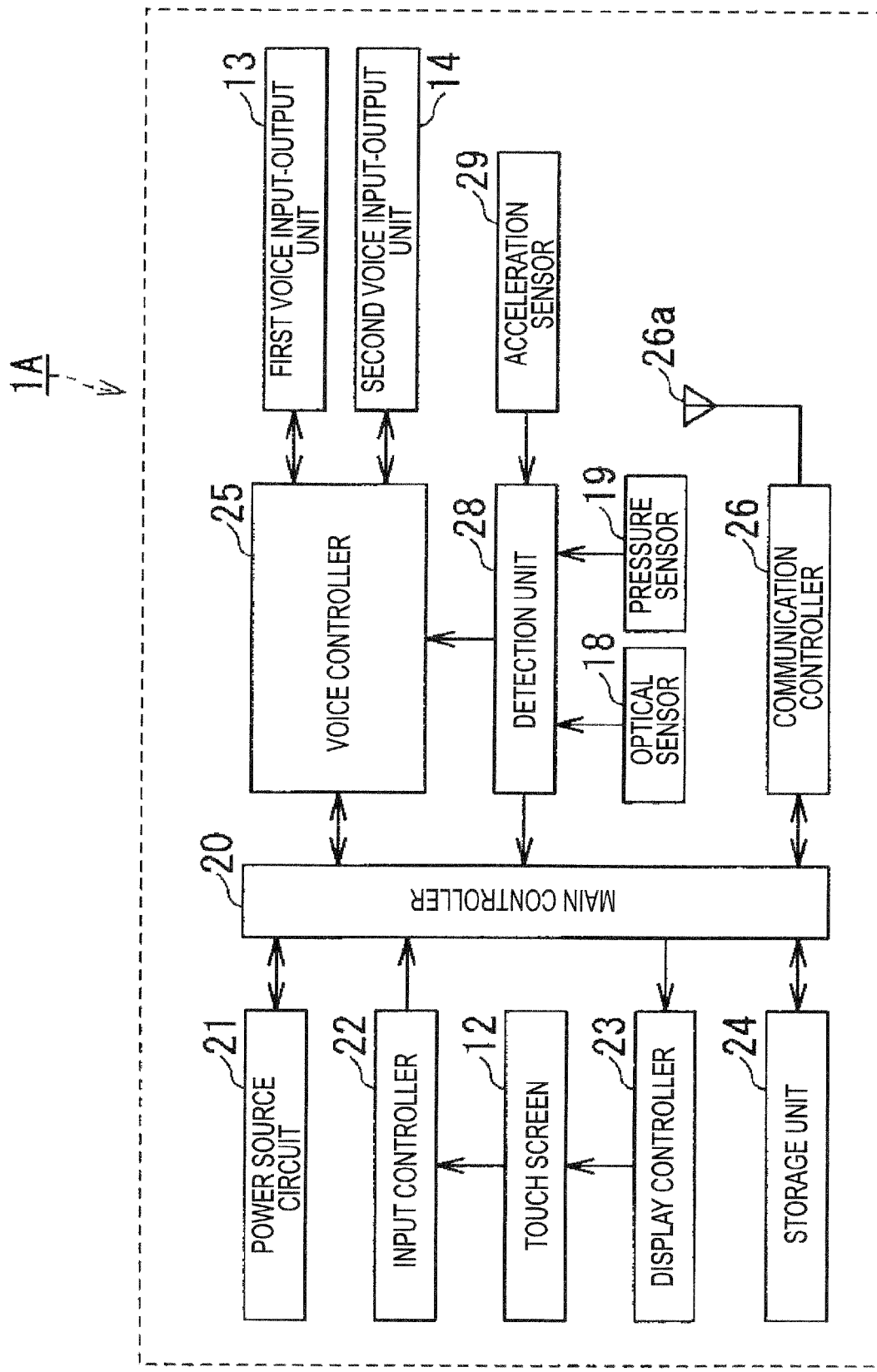
FIG. 8 is an exemplary block diagram illustrating functions of the portable terminal according to the second embodiment.

Next, the functions of the portable terminal 1A will be described. FIG. 8 is a block diagram illustrating functions of the portable terminal 1A. As shown in FIG. 8, the portable terminal 1A includes a main controller 20, a power source circuit 21, an operation input controller 22, a display controller 23, a storage unit 24, an audio controller 25, a communication controller 26, and the detection unit 28 which are electrically connected to each other through a bus.

The detection unit 28 acquires a signal indicating the level of light from the optical sensor 18 and transmits the signal to the main controller 20 or the audio controller 25. The detection unit 28 acquires a signal indicating the pressure from the pressure sensor 19 and transmits the signal to the main controller 20 or the audio controller 25. The detection unit 28 acquires a signal acceleration applied from an acceleration sensor 29 (accelerometer) to the portable terminal 1 and transmits the signal to the main controller 20 or the audio controller 25.

The acceleration sensor 29 is a sensor which measures the acceleration applied to the portable terminal 1A. A general measurement principle is that the deformation of a spring upon applying the acceleration is used. The acceleration sensor 29 detects the displacement of a spring equipped in the acceleration sensor 29 and measures the acceleration using the mass of the portable terminal 1A measured in advance and stored in the storage unit 24 and a spring constant of the spring. In the measurement of the displacement, a variation in the electrostatic capacity or a variation in electric resistance by deformation gauge or a piezoresistance effect is used. The acceleration sensor 29 generates a signal indicating the acceleration (gravity) applied to the portable terminal 1 and transmits the signal to the detection unit 28.

EXAMPLE 3

Figure 9:
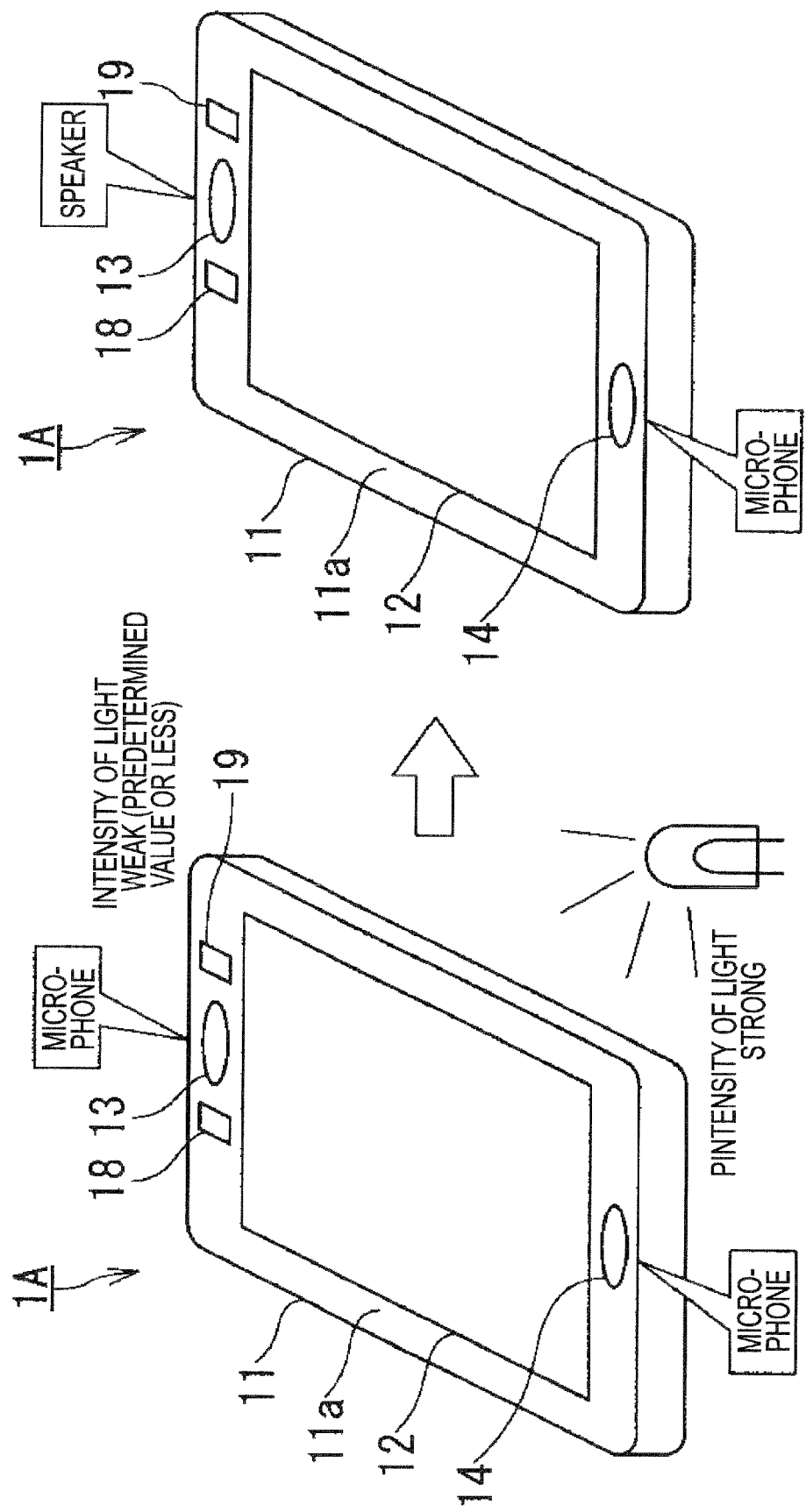
FIG. 9 is an exemplary diagram for explaining an audio input-output control process based on the level of ambient light in the portable terminal according to the second embodiment.
Figure 10:
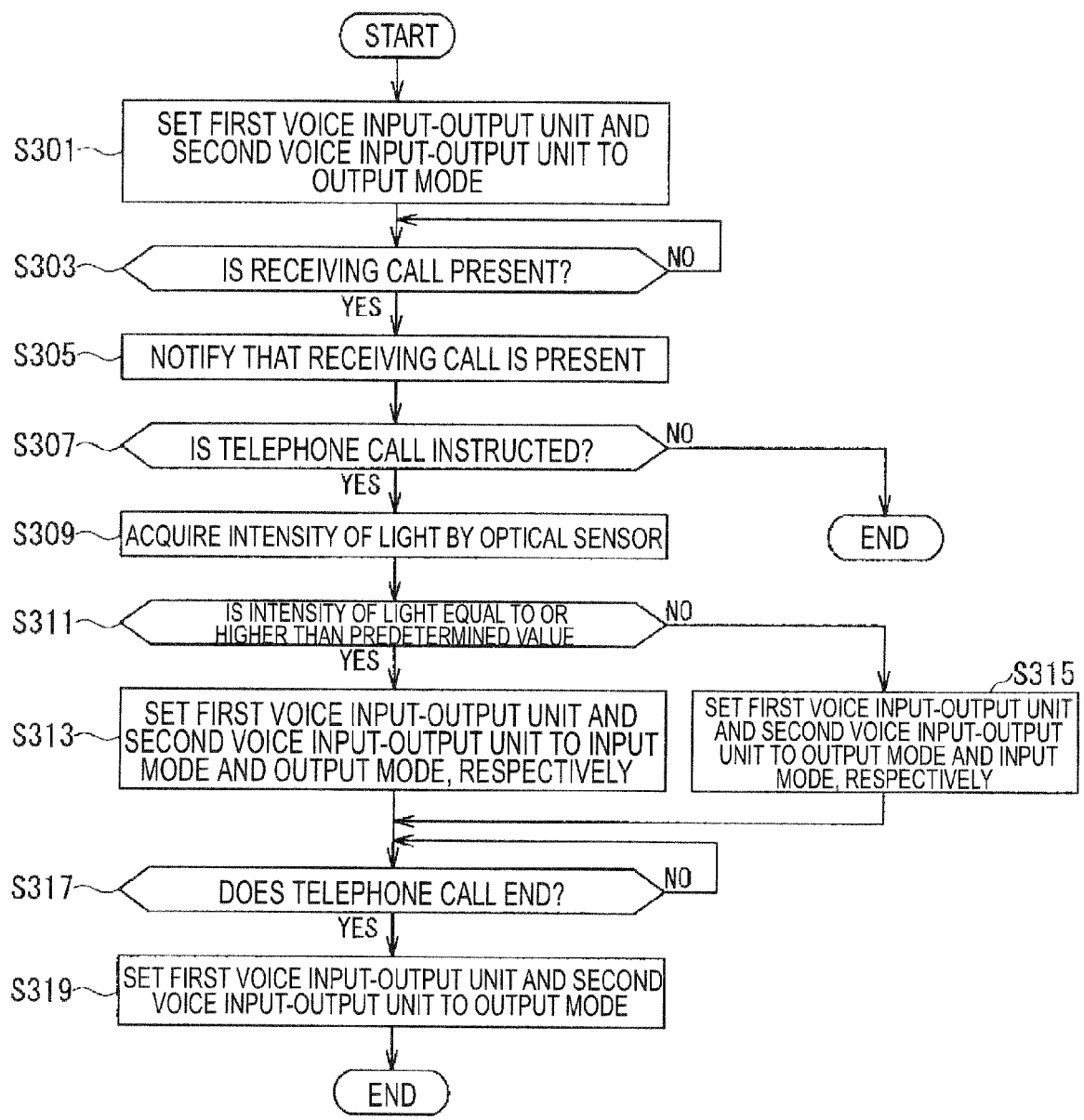
FIG. 10 is an exemplary flowchart illustrating a sequence of the audio input-output control process based on the level of ambient light in the portable terminal according to the second embodiment.

The portable terminal 1A will be described with reference to FIGS. 9 and 10 according to Example 3 of the second embodiment. As shown in FIG. 9, the portable terminal 1A performs the audio input-output control process of setting the respective input-output modes of the first audio input-output unit 13 and the second audio input-output unit 14 on the basis of the level of the light incident on the portable terminal 1A at calling time. A sequence of the audio input-output control process performed by the portable terminal 1A in Example 3 will be described with reference a flowchart shown in FIG. 10.

In a standby state of the portable terminal 1A, the audio controller 25 sets both the first audio input-output: unit 13 and the second audio input-output unit 14 to the output mode (S301), as in Example 1 or 2. The audio controller 25 determines whether a receiving call is present in the portable terminal 1A (S303). When the receiving call is not present (No in S303), the audio controller 25 just stands by.

Alternatively, when the receiving call is present in the portable terminal 1 (Yes in S303), the audio controller 25 notifies a user that the receiving call is present by outputting a predetermined sound by the first audio input-output unit 13 and the second audio input-output unit 14 set to the output mode, for example (S305). At this time, the display controller 23 may notify the user that the receiving call is present, by displaying a text or an image on the touch screen 12.

The audio controller 25 determines whether a telephone call is instructed (S307). At this time, it is determined that the telephone call is instructed when an input operation is performed through the touch screen 12 by the user, for example. When the telephone call is not instructed (No in S307), the audio controller 25 just ends the audio input-output control process.

Alternatively, when the telephone call is instructed (Yes in S307), the detection unit 28 acquires the level of the light detected by the optical sensor 18 (S309). The optical sensor 18 which is provided in the vicinity of the first audio input-output unit 13 detects the level of light in the vicinity the first audio input-output unit 13.

The audio controller 25 determines whether the level of the light acquired in Step S309 is equal to or higher than a predetermined value (S3111). The predetermined value is set in advance and stored in the storage unit 24, for example. The respective audio input-output modes of the first audio input-output unit 13 and the second audio input-output unit 14 are set in consideration of putting one of the first audio input-output unit 13 and the second audio input-output unit 14 on the ear and the other thereof on the mouth when the user makes a call using the portable terminal 1A. That is, when the user puts the first audio input-output unit 13 of the portable terminal 1A on the ear, the level of the light input to the optical sensor 18 is relatively weak. When the user puts the first audio input-output unit 13 to the mouth, the level of the light input to the optical sensor 18 is relatively strong. Accordingly, when the level of the light is strong, the first audio input-output unit 13 is set to the input mode. In addition, when the level of the light is weak, the first audio input-output, unit 13 is set to the output mode.

When the level of the light input to the optical sensor 18 is equal to or higher than the predetermined value (Yes in S311), the audio controller 25 sets the first audio input-output unit 13 and the second audio input-output unit 14 to the input mode and the output mode, respectively. Alternatively, when the level of the light input to the optical sensor 18 is not equal to or higher than the predetermined value (No in S311), the audio controller 25 sets the first audio input-output unit 13 and the second audio input-output unit 14 to the output mode and the input mode, respectively.

In this way, the user can smoothly make a telephone call without awareness of a directs on of the portable terminal 1A by automatically setting to the input mode (microphone) one of the first audio input-output unit 13 the second audio input-output unit 14 which is closer to a mouth as an audio source and sets to the output mode (speaker) and the other thereof which is away from the mount as the audio source, when the user makes a telephone call with the portable terminal 1A.

The audio controller 25 determines whether the telephone call ends or not (S317). At this time, it is determined that the telephone call ends when the user inputs a message through the touch screen 12 or the communication with the communication opponent is interrupted, for example. When the telephone call does not end (No in S317), the audio controller 25 stands by until the end of the telephone call.

Alternatively, when the telephone call ends (Yes in S317), the audio controller 25 sets both the first audio input-output unit 13 and the second audio input-output unit 14 to the output mode (S319). In this way, as in Step S301, it is possible to promptly output the audio from both the first audio input-output unit 13 and the second audio input-output unit 14, if necessary.

In this way, the portable terminal 1 includes the first audio input-output unit and the second audio input-output unit having both the audio input function and the audio output function. Therefore, both the first audio input-output unit and the second audio input-output unit are set to the output mode (speaker) at standby time and set to the input mode (microphone) at the time point when the opponent audio is interrupted at receiving call time. At this time, one of the first audio input-output unit and the second audio input-output unit which detects block of the light is set to the output mode (speaker) and the other thereof is set to the input mode (microphone), when it is detected that the light incident to the optical sensor 18 is blocked since the optical sensor 18 is screened by an object.

In sending a call, the processes from Step S309 to S315 may be performed at time point when the start of a sending call is instructed through the touch screen 12. Moreover, in sending a call, the process in Step S309 may be initiated at time point when an instruction for making the sending call is input through the touch screen 12.

In the portable terminal 1A, the respective input-output modes of the first audio input-output unit 13 and the second audio input-output unit 14 may be set using the pressure sensor 19. In this case, the pressure sensor 19 detects the pressure in Step S309. When the pressure is equal to or larger than a predetermined value, the process is returned to Step S315. Alternatively, when the pressure is not equal to or larger than a predetermined value, the process is returned to Step S313. That is because it is considered that the pressure detected by the pressure sensor 19 is equal, to or larger than the predetermined value when the first audio input-output unit 13 is put on the ear at calling time, and it is considered that the pressure detected by the pressure sensor 19 provided in the vicinity of the first audio input-output unit 13 is not equal to or larger than the predetermined value normally without change when the second audio input-output unit 14 is out on the ear at calling time.

In the portable terminal 1A, the respective input-output modes of the first audio input-output unit 13 and the second audio input-output unit 14 may be set using a reception sensitivity of the plural antennas 26a. For example, when the antennas 26a are provided in, the vicinity of the first audio input-output unit 13 and the second audio input-output unit 14, respectively, the reception sensitivity of the respective antennas 26a is acquired from the communication controller 26 in Step S309. At this time, when the reception sensitivity of the antenna 26a closer to the first audio input-output unit 13 is high, the process is turned to Step S313. When the reception sensitivity of the antenna 26a closer to the second audio input-output unit 14 is high, the process is returned to Step S315. That is because it is considered that reception sensitivity of the antenna 26a closer to the first audio input-output unit 13 is lowered when the first audio input-output unit 13 is put on the ear at calling time, and it is considered that reception sensitivity of the antenna 26a closer to the second audio input-output unit 14 is lowered when the second audio input-output unit 14 is put on the ear at calling time.

In the portable terminal 1A, the respective input-output modes of the first audio input-output unit 13 and the second audio input-output unit 14 may be set using the acceleration sensor 29. In this case, the acceleration sensor 209 detects a direction of the acceleration (gravity) in Step S309. When the first audio input-output unit 13 is located in a front side in an acceleration direction, the process is returned to Step S313. When the second audio input-output unit 14 is located in a front side in an acceleration direction, the process is returned to Step S315. That is because the first audio input-output unit 13 is located upward and the second audio input-output unit 14 is located downward when the first audio input-output unit 13 is put on the ear at calling time, and the second audio input-output unit 14 is located upward and the first audio input-output unit 13 is located downward when the second audio input-output unit 14 is put on the ear at calling time.

According to Example 3 of the second embodiment, the portable terminal 1A includes the first audio input-output unit 13 and the second audio input-output unit 14 capable of switching and using both the audio input function and the audio output function. Therefore, the user can use portable terminal 1A without awareness of the microphone and the speaker while QOS (Quality of Service) of an audio is maintained, compared to a terminal which separately include an audio input unit (microphone) and an audio output unit (speaker). Accordingly, usability of the portable device is improved.

According to Example 3 of the second embodiment, the portable terminal 1A can determine more accurately an input side and an output side of the first audio input-output unit 13 and the second audio input-output unit 14, by detecting the level of light, the pressure applied to the portable terminal 1A, the reception sensitivity of the antenna, or the acceleration at calling time and setting the respective input-output modes of the first audio input-output unit 13 and the second audio input-output unit 14 on the basis of the detection result.

EXAMPLE 4

Figure 11:
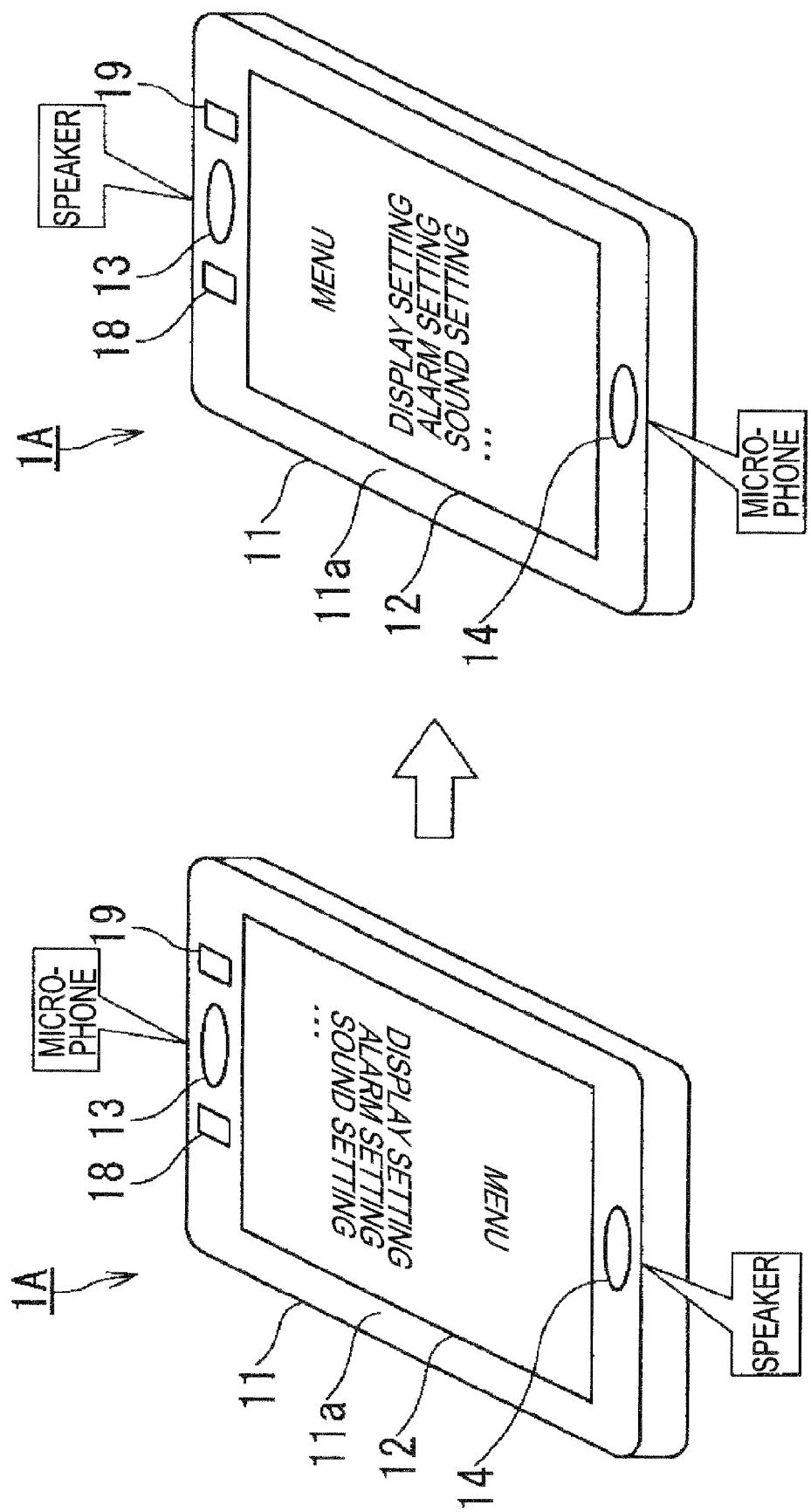
FIG. 11 is an exemplary diagram for explaining a display control process based on input-output modes of audio input-output units in the portable terminal accordion to the second embodiment.

The portable terminal 1A will be described with reference to FIGS. 11 and 12 according to Example 4 of the second embodiment. As shown in FIG. 11, the portable terminal, 1A performs a display control process of switching a vertical direction of a picture displayed on the touch screen 12 on the basis of the respective input-output modes or the first audio input-output unit 13 and the second audio input-output unit 14 at calling time. A sequence of the display control process performed by the portable terminal 1A will be described with reference a flowchart shown in FIG. 12. In the other words, the display setting unit (display controller) sets an orientation of a screen to the display device based on the respective input-output modes of the first audio input-output unit and the second audio input-output unit set by the display setting unit.

The display controller 23 determines whether a display is instructed or not (S401).

The display controller 23 acquires the respective input-output modes of the first audio input-output unit 13 aid the second audio input-output unit 14 (S403). At this time, the storage unit 24 stores the input-output mode at a step at which the previous display of the first audio input-output unit 13 and the second audio input-output unit 14 ends, for example. The display controller 23 acquires information indicating the input-output mode stored in the storage unit 24, for example.

The display controller 23 determines whether the first audio input-out-put unit 13 is in the output mode or not (S405). When the first audio input-output unit 13 is in the output mode (Yes in S405), the display controller 23 performs the display control process so that the first audio input-output unit 13 is located upward and the second audio input-output unit 14 is located downward (S407).

Alternatively, when the first audio input-output unit 13 is not in the output mode (No in S405), the display controller 23 performs the display control process so that the first audio input-output unit 13 is located downward and the second audio input-output unit 14 is located upward (S409).

The display controller 23 determines whether a display switch is instructed or not (S411). At this time, the display switch is instructed by inputting a message through the touch screen 12 by the user, for example. When the display switch is not instructed (No in S409), the display controller 23 just stands by. Alternatively, when the display switch is instructed (Yes in S409), the display controller 23 performs the display control process in the touch screen 12 by inverting the vertical direction (S413).

In the portable terminal 1A, the user can refer the data stored in the portable terminal 1A through the touch screen 12 during the audio input-output such as the telephone call. Therefore, when the respective input-output modes of the first audio input-output unit 13 and the second audio input-output unit 14 are set, the vertical direction of a display on the touch screen 12 is determined. Accordingly, the vertical direction of the display is switched, if necessary.

The portable terminal 1A receives an input for changing the vertical direction of the display on the touch screen 12 through the touch screen 12, for example, and switches the vertical direction of the display on the basis of the input.

The portable terminal 1A may store the input-output mode used in the previous final picture, sets the respective in input-output modes of the first audio input-output unit 13 and the second audio input-output unit 14, and then carries out feedback on the basis of the information detected by the detection unit 28, in that a method of seizing the portable terminal depends on the habit of users at calling time and thus there is a high possibility that when one of the first audio input-output unit 13 and the second audio input-output unit 14 is a speaker, the other thereof is a microphone.

According to Example 4 of the second embodiment, the portable terminal 1A includes the first audio input-output unit 13 and the second audio input-output unit 14 capable of switching and using both the audio input function and the audio output function. Therefore, the user can use portable terminal 1A without awareness of the microphone and the speaker while QOS (Quality of Service) of an audio is maintained, compared to a terminal which separately include an audio input unfit (microphone) and an audio output unit (speaker). Accordingly, usability of the portable device is improved.

In the portable terminal 1A according to Example 4 of the second embodiment, the user can smoothly view the information stored in the portable terminal 1A by switching the vertical direction of the display on the touch screen 12 on the basis of the respective input-output modes of the first audio input-output unit 13 and the second audio input-output unit 14.

In the portable terminal 1A according to Example 4 of the second embodiment, the user can seize and operates the portable terminal 1A in the same direction as that used at the previous time, by storing the previously stored the input-output modes of the first audio input-output unit 13 and the second audio input-output unit 14 and setting the vertical direction of the display on the touch screen 12 on the basis of the stored input-output modes. In the other words, a storage unit stores the respective modes of the first audio input-output unit and the second audio input-output unit when the display device stops displaying the image. And then, the display setting unit (display controller) sets the orientation of the screen to the display device based on the respective modes stored in the storage unit when the display device starts displaying the image.

In the portable terminal 1A according to Example 4 of the second embodiment, the user can smoothly view the information stored in the portable terminal 1A, by switching the vertical direction of the display on the touch screen 12 on the basis of the input operation of the user through the touch screen 12.

The portable terminals 1 and 1A according to the invention have been described. However, the invention is not limited thereto, but is applied to any terminal capable of inputting and outputting an audio, such as a PHS (Personal Handyphone System), a PDA (Personal Digital Assistants), a portable music player, and a portable game device.

As described with reference to the embodiment, there is provided a portable terminal capable of improving usability since a user handles the portable terminal without awareness of a speaker and a microphone while maintaining QOS (Quality of Service) of an audio.

According to the embodiment, a portable terminal includes a first audio input-output unit and a second audio input-output unit switching and using both an audio input function and an audio output function. With such a configurations a user can use the portable terminal without awareness of a speaker and a microphone while QOS (Quality of Service) of an audio is maintained, compared to a portable terminal in which an audio input unit (microphone) and an audio output unit (speaker) are separately formed.

What is claimed is:

1. A portable terminal comprising:
    a first audio input-output unit and a second audio input-output unit configured to receive audio when a mode is set as an input mode and output audio when the mode is set as an output mode;
    a setting unit configured to set the respective modes of the first audio input-output unit and the second audio input-output unit; and
    a determination unit configured to select an input unit from the first audio input-output unit and the second audio input-output unit based on a level of audio signal received by the first audio input-output unit and the second input-output unit when both the first audio input-output unit and the second audio input-output unit are set to the input mode,
    wherein the setting unit sets one of the first audio input-output unit and the second audio input-output unit to the input mode, which is selected as the input unit by the determination unit, and sets the other of the first audio input-output unit and the second audio input-output unit to the output mode.

2. The portable terminal according to claim 1, wherein the detection unit is configured to detect a radio-wave reception level around the first audio input-output unit and the second audio input-output unit, wherein the setting unit sets one of the first audio input-output unit and the second audio input-output unit to the output mode, which is determined that the radio-wave reception level is higher than the other of the first audio input-output unit and the second audio input-output unit by the detection unit, and sets the other of the first audio input-output unit and the second audio input-output unit to the input mode.

3. The portable terminal according to claim 1, further comprising: a photosensor detects a level of ambient light, wherein the setting unit sets the respective modes of the first audio input-output unit and the second audio input-output unit based on the level of light detected by the photosensor.

4. The portable terminal according to claim 1, further comprising: a pressure sensor detects a pressure applied to the portable terminal, wherein the setting unit sets the respective modes of the first audio input-output unit and the second audio input-output unit based on the pressure detected by the pressure sensor.

5. The portable terminal according to claim 1, further comprising: an accelerometer detects an acceleration applied to the portable terminal, wherein the setting unit sets the respective modes of the first audio input-output unit and the second audio input-output unit based on the acceleration detected by the accelerometer.

6. The portable terminal according to claim 1 further comprising: a notification unit configured to notify the respective input-output modes of the first audio input-output unit and the second audio input-output unit to a user.

7. The portable terminal according to claim 6, wherein the notification unit includes a LED.

8. The portable terminal according to claim 1, further comprising: a display device that displays an image; and a display setting unit configured to set an orientation of a screen to the display device based on the respective input-output modes of the first audio input-output unit and the second audio input-output unit set by the display setting unit.

9. The portable terminal according to claim 8, wherein the display setting unit configured to redisplay the image based on an instruction for setting the orientation of the screen, when receiving the instruction for setting the orientation of the screen.

10. The portable terminal according to claim 8, further comprising: a storage unit configured to store the respective modes of the first audio input-output unit and the second audio input-output unit when the display device stops displaying the image, wherein the display setting unit configured to set the orientation of the screen to the display device based on the respective modes stored in the storage unit when the display device starts displaying the image.

11. The portable terminal according to claim 1 further comprising: an audio recording unit configured to record audio of an intended party when the first audio input-output unit and the second audio input-output unit are set to the input mode.

12. The portable terminal according to claim 1, further comprising: an input unit to which the user inputs an instruction, wherein the setting unit sets the respective modes of the first audio input-output unit and the second audio input-output unit based on the instruction input to the input unit.

13. The portable terminal according to claim 12, wherein the input unit includes a touch screen.

14. The portable terminal according to claim 1, wherein the determination unit configured to select the input unit from the first audio input-output unit and the second audio input-output unit based on a level of audio frequency component on the audio signal received by the respective audio input-output unit.

* * * * *